United States Patent [19]
Williams

[11] 3,944,895
[45] Mar. 16, 1976

[54] PLASTIC CAPACITORS
[75] Inventor: Colin Williams, Biggleswade, England
[73] Assignee: Imperial Chemical Industries Limited, London, England
[22] Filed: Feb. 21, 1974
[21] Appl. No.: 401,611

[52] U.S. Cl. ............................. 317/258; 29/25.42
[51] Int. Cl.² ............................................ H01G 4/18
[58] Field of Search ........... 29/25.42; 317/260, 258; 174/DIG. 8

[56] References Cited
UNITED STATES PATENTS

| | | | |
|---|---|---|---|
| 3,093,448 | 6/1963 | Kirkpatrick | 174/DIG. 8 |
| 3,391,313 | 7/1968 | Hevey | 317/260 X |
| 3,484,664 | 12/1969 | Liddicoat | 317/260 X |

FOREIGN PATENTS OR APPLICATIONS

| | | | |
|---|---|---|---|
| 580,489 | 9/1946 | United Kingdom | 317/258 |

OTHER PUBLICATIONS

Dummer et al., Fixed & Variable Capacitors, McGraw Hill, N.Y. 1960, pp. 142–143.

*Primary Examiner*—E. A. Goldberg
*Attorney, Agent, or Firm*—Cushman, Darby & Cushman

[57] ABSTRACT

A wound electrical capacitor having a thermoplastic film dielectric spacer with specified thermal shrinkage characteristics and provided with a shrinkable sleeve which contracts during thermal stabilization of the capacitor to expel air and moisture from the capacitor winding to reduce capacitance loss on accelerated life testing.

10 Claims, 2 Drawing Figures

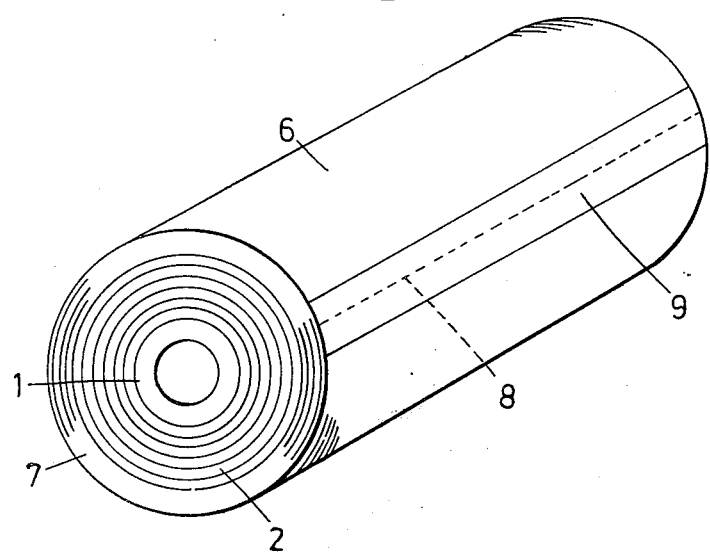

PLASTIC CAPACITORS

This invention relates to wound electrical capacitors.

A wound electrical capacitor usually comprises a pair of electrically conductive electrodes spaced apart by an insulating dielectric spacer disposed therebetween, the electrodes and spacer being in the form of longitudinal webs which are wound together to form an assembly of substantially cylindrical configuration, which term includes not only right circular cylinders but also any structure generated by a straight line moving parallel to itself and describing with its ends any closed curve. Capacitors of this kind have been provided with a protective sleeve, formed by winding several turns of polyethylene strip around the capacitor and thermally shrinking the strip into position, to seal the capacitor winding against ingress of moisture and other contaminants from the surrounding atmosphere.

A problem encountered in the production of wound capacitors, and not effectively eliminated by the use of protective sleeves of the aforementioned kind, is the entrapment between adjacent layers of the capacitors winding of air pockets which result in the electrical strength of the capacitor being markedly reduced, the corona starting voltage being lowered, and the capacitor being susceptible to premature breakdown and shortened operational life. This problem is believed to result, at least to some extent, from the high frictional forces and lack of slip between adjacent layers of the winding, and may be partially alleviated by improving the slip characteristics of the winding materials — for example by the incorporation therein of slip improvers, such as particulate silica, or by embossing one or more of the layers. Impregnation of the capacitor with a dielectric fluid is also employed to reduce the incidence of air voids, but it is usually desirable to subject the capacitor to a thermal stabilizing treatment, during which the capacitor is heated, usually under vacuum, to remove the trapped air.

We have now devised an improved capacitor assembly to facilitate the removal of trapped air therefrom.

Accordingly, the present invention provides a wound electrical capacitor comprising at least a pair of electrically conductive electrodes, an insulating dielectric spacer disposed therebetween, the electrodes and spacer being wound together to form the capacitor winding, and a constrictive sleeve enveloping the winding, wherein
   a. the spacer comprises a longitudinal thermoplastic polymeric film strip having (1) a thermal shrinkage in the longitudinal direction of from 5.0 to 10 percent, and (2) a ratio of thermal shrinkage in the longitudinal direction to that in a direction at right angles thereto of from 1.7:1 to 10:1, and
   b. the sleeve (1) extends over at least 75 percent of the exposed surface area of the capacitor winding, and (2) has a thermal shrinkage in the longitudinal direction at least 1.02 times that of the spacer,
said thermal shrinkages being determined as hereinafter defined.

Reference to the longitudinal shrinkage of the sleeve is intended to include thermal shrinkage in a circumferential direction around the peripheral surface of the capacitor in the case of a sleeve in the form of a cylindrical sheath slipped around the capacitor winding, as well as thermal shrinkage along the length of a continuous film or strip of material to be applied to a sleeve in the form of overlapping windings.

The invention also provides a method of forming a wound electrical capacitor comprising winding together at least a pair of electrically conductive electrodes with a dielectric spacer disposed therebetween, the electrodes and spacer together constituting the capacitor winding, enveloping the winding in a thermally shrinkable sleeve, and thermally stabilizing, as hereinafter defined, the sleeved winding, wherein
   a. the spacer comprises a longitudinal thermoplastic polymeric film strip having (1) a thermal shrinkage in the longitudinal direction of from 5.0 to 10 percent, and (2) a ratio of thermal shrinkage in the longitudinal direction to that in a direction at right angles thereto of from 1.7:1 to 10:1, and
   b. the sleeve (1) extends over at least 75 percent of the exposed surface area of the winding, and (2) has a thermal shrinkage in the longitudinal direction at least 1.02 times that of the spacer,
said thermal shrinkages being determined as hereinafter defined.

Thermally stabilizing the wound capacitor assembly involves heating the assembly to a temperature at which residual moisture and occluded air are expelled from the assembly. The stabilizing temperature will vary depending on the dielectric material and on the desired length of the stabilizing cycle, but usually is within a range of from 100° C to 140° C. At lower temperatures, the stabilizing period is excessively long and the desired thermal shrinkage may not be achieved, while higher temperatures may cause decomposition and/or excessive transverse shrinkage of the dielectric spacer. The stabilizing temperature is therefore selected so that the desired compressive forces are exerted, within a convenient period of time, on the dielectric spacer without detriment to the electrical characteristics of the latter. Desirably, stabilization should be complete in less than 10 hours, preferably within 5 hours. For a capacitor having a polypropylene film dielectric spacer, a convenient stabilizing temperature is in the range from 105° C to 125° C. Stabilization may, if desired, be effected under conditions of reduced pressure, e.g. 0.01 mm Hg to 1mm Hg.

The longitudinal thermal shrinkage of the dielectric film spacer is determined on a strip of film some 10 mm wide and 30 mm long excised from a roll of film so that the longitudinal axis of the strip coincides with the direction of extrusion of the film-forming material - the Longitudinal of Machine direction. Two reference lines are marked on the strip a specified distance, D, apart, and one end of the strip is placed in a clip from which the strip is freely suspended, without restraint, for 15 minutes in an air oven maintained at the temperature at which a capacitor fabricated from the film under test will be thermally stabilized — for example, 115° C in the case of a polypropylene spacer. The distance, d, between the reference lines on the shrunken strip is then determined, and the percentage shrinkage defined as, (D-d)100/D. The longitudinal thermal shrinkage of the sleeve material is determined in a similar manner, as is the transverse shrinkage of the spacer strip, except that in the latter case a strip is selected such that the longitudinal axis thereof is at right angles to the direction of extrusion of the film-forming material.

In winding the capacitor, the dielectric spacer strip, and the sleeve, if a film strip is employed for this purpose, are positioned so that the Longitudinal or Machine direction of the film strip forming the sleeve coincides with or is parallel to, a tangent to the axial core about which the capacitor is wound.

We have found that dielectric spacers having a longitudinal thermal shrinkage, as hereinbefore defined, of from 5.0 to 10 percent, provide an acceptable degree of contraction, and thereby tightening, of the winding during thermal stabilization to expel trapped air from within the winding. Insufficient contraction is provided at lower thermal shrinkages, while values in excess of 10 percent confer little additional expulsion of air, and improvement in electrical characteristics. Preferably, dielectric spacers having a longitudinal thermal shrinkage of from 5.5 to 8.5 percent, under the specified conditions, should be employed.

Conveniently, electrical connection to the capacitor is made, in the case of a metalized film or an extended foil-capacitor, by the conventional technique of spraying a metallic layer or coating onto each of the end faces of the capacitor. Alternatively, electrical contact may be established by means of axially inserted connecting tags. To avoid disruption of the sprayed on metallic coating during thermal cycling of the capacitor in normal use, and/or to avoid loss of capacitance during thermal stabilization of the capacitor, by undue shrinkage of the spacer in a transverse direction, i.e., parallel to the axis of winding, the thermal shrinkage of the spacer in the transverse direction should be less than that in the longitudinal direction. Acceptable behavior is achieved with a ratio of longitudinal to transverse thermal shrinkage as hereinbefore defined of from 1.7:1 to 10:1. Preferably, a shrinkage ratio of from 1.75:1 to 2.5:1 is employed.

Thermoplastic polymeric films suitable for use as dielectric spacers in the capacitors of the present invention, include films formed from any thermoplastic material possessing the required electrical and thermal shrinkage properties and capable of being formed into film by any conventional film-forming technique. Suitable materials include polycarbonates, polysulphones, polyesters such as polyethylene terephthalate and polyethylene-1,2-diphenoxyethane-4,4'-dicarboxylate, and polyolefins. A preferred material is a high molecular weight stereo-regular predominantly crystalline polymer of propylene, either in the form of a homopolymer or copolymerised with minor quantities (e.g. up to 15 percent by weight based on the weight of the copolymer) of other unsaturated monomers such as ethylene.

Films are suitably formed from these materials in any conventional manner, as, for example, by rolling, extruding, pressing, solvent casting or melt casting techniques, and are preferably oriented by stretching the film to impart strength thereto. A particularly suitable film is produced by melt extruding polypropylene in the form of a tube from an annular die, inflating the tube by the so called "bubble" process to introduce transverse orientation, and simultaneously elongating the tube longitudinally to orient the film in the lengthwise direction. The oriented film is then stabilized against thermal shrinkage by a "heat-setting" operation which involves heating the film, while held under tension, to a temperature below the melting point of the film.

Thermoplastic films suitable for use as dielectric spacers in the capacitors of the present invention vary in thickness from 4 to about 50 microns, but to facilitate the incorporation of the films into capacitors a film thickness of between about 6 and 15 microns is preferred.

If desired, the slip characteristics of the film spacer, and impregnation characteristics of a capacitor wound therefrom, may be improved by dispersing in the film so as to form projections on at least one surface thereof, from 0.01 to 1 percent by weight, based on the weight of the film, of an inert, particulate dielectric material having an average particle diameter of from 1 to 5 microns, as disclosed in our copending British patent application No. 11012/71. Alternatively, the film may be provided with surface projections by an embossing technique, or by selectively shrinking portions of the film.

The dielectric film spacer may also contain any of the additives normally employed in the thermoplastic films for use in the electrical industry. For example, the film spacer may contain an anti-oxidant, and/or an anti-corrosion agent — such as calcium stearate.

The electrically conductive electrodes of the capacitor may be in the form of a foil — for example, of aluminum or tin. However, in a preferred embodiment of the invention, the electrically conductive electrode is integrated with the dielectric spacer in the form of a metalized film strip or web, thereby facilitating assembly of the capacitor by eliminating the need for a separate spacer. Regenerative or "self-healing" capacitors are commonly of this type.

Any of the aforementioned films may be metalized, by conventional metallizing techniques, for use as integrated electrically conductive electrode-spacers in the capacitors of this invention. Metallizing is suitably effected by a vacuum deposition technique in which a metal, such as aluminium, zinc, silver, gold or nickel, is evaporated onto the surface of a film located in a chamber maintained under conditions of high vacuum to deposit a layer of metal onto the film surface. Suitably, the film surface is subjected to chemical or physical treatments, for example, oxidation with mineral acids or exposure to a corona discharge, prior to metallizing, thereby to improve the adhesion of the metallic layer of the film substrate. Although a corona discharge treatment is our preferred technique for improving the bonding properties of the film surface, the treatment induces an electrostatic charge on the film surface, and it is desirable that this charge should be eliminated both to facilitate handling of the film prior to metallizing and to avoid the incidence of burn or tracking marks, so-called "tree patterns," on the surface of the film, these patterns being created, we believe, by the discharge of the residual charge through an adsorbed layer of air which is usually associated with the film surface. Accordingly, we prefer that the discharge-treated film should be destaticized before metallizing for example by directing a current of ionized air against the charged surface of the film. Subsequently subjecting the film to a vacuum, suitably by reeling the film through an evacuated chamber, serves to remove contaminants which may be present on the surface of the film.

The thickness of the metalized layer is conveniently from 5 to 50 nanometres, and particularly from 7 to 14 nanometres in the case of aluminium, and from 20 to 40 nanometres in the case of zinc. A polypropylene film metallised with aluminum or zinc is a preferred electrode-spacer.

A combined electrode-spacer may, of course, be roughened, if desired, for example, by incorporation therein of a particulate dielectric material or by an embossing technique, as hereinbefore described.

The constrictive sleeve functions by shrinking at the capacitor stabilizing temperature to compress the winding of the capacitor, thereby assisting the expulsion of air and moisture from between adjacent layers of the winding, particularly from between the outermost layers, which, by virtue of the reduced number of layers superimposed thereon, are subjected to an inherently smaller compressive force than that exerted on the innermost layers of the capacitor winding. The sleeve must therefore be capable of shrinking in a circumferential direction by an amount sufficient to provide the required compressive stress, and we find that a sleeve wound from a strip of material having a longitudinal thermal shrinkage of at least 1.02 times that of the dielectric spacer, as hereinbefore defined, is necessary. Preferably, a sleeve strip having a longitudinal thermal shrinkage of between 1.05 and 2.5 times that of the spacer is employed. In practice, we prefer to employ a sleeve having a longitudinal thermal shrinkage not exceeding 15 percent.

Transverse thermal shrinkage of the sleeve, i.e., in a direction parallel to the axis of the capacitor, does not, of course, exert significant compressive forces on the windings, but merely serves to reduce the axial dimensions of the sleeve.

The sleeve should be of sufficient strength that the desired compressive stress may be exerted without rupture of the sleeve.

Furthermore, to ensure that the sleeve is not subjected to excessive stress by thermal expansion of the capacitor winding during the thermal stabilization thereof, the sleeve and dielectric spacer materials should be selected so that the coefficient of thermal expansion of the sleeve material is at least equal to, and preferably exceeds, that of the dielectric spacer material. This condition is conveniently satisifed by selecting the same polymeric material as both dielectric spacer and sleeve.

To achieve adequate explusion of air and moisture from between adjacent layers of the capacitor winding the sleeve should extend over at least 75 percent of the exposed surface of the capacitor winding, i.e., the peripheral surface excluding the planar end faces of the capacitor. Preferably, however, the sleeve should extend over the entire exposed surface area of the winding, excluding the end faces.

The sleeve may be in the form of a cylindrical sheath which is slipped axially onto the wound capacitor, and subsequently shrink-fitted in position, but in a preferred embodiment of the invention the sleeve is formed by winding a longitudinal web around the capacitor in the direction of winding thereof, and sealing the free end of the sleeve web to the preceding layer of the web by any convenient means — for example, by an adhesive, or by use of a superimposed adhesive tape.

The axial dimension of the sleeve winding may correspond to that of the capacitor winding, or the sleeve may comprise several narrower windings spaced apart, or in contiguous relationship, along the capacitor axis.

Suitably, the sleeve is fabricated from any unmetallized, thermoplastic polymeric film having the required shrinkage properties. In the case of a polypropylene film spacer and sleeve the desired shrinkage properties may be obtained by suitably controlling the conditions employed in manufacturing the film, particularly the conditions of "heat-setting" the film. Thus shrinkage may be controlled by suitably adjusting the temperature to which the film is subjected during heat-setting, or by controlling the amount by which the film is allowed to relax or shrink during heat-setting. Shrinkable films may also be produced by other techniques known to those skilled in the art, for example — by orienting films at relatively high draw ratios, or by orienting films at relatively low temperatures, for example — by cooling the shoulder of a film "bubble" in a tubular film-forming process of the kind disclosed in our British Pat. No. 954,254, whereby a tubular film is formed by inflation of a thermoplastic tube having a relatively high hoop-stress.

Conveniently the sleeve is fabricated from the same polymeric material as that from which the dielectric spacer is formed, thereby ensuring that the sleeve and dielectric spacer are electrically compatible, are stable over substantially identical temperature ranges, and, as hereinbefore described, have mutually acceptable coefficients of thermal expansion. For example, a polypropylene film sleeve is desirably employed on a capacitor in which the dielectric spacer is a polypropylene film. In particular, as metallizing tends further to "heat-set" a film, thereby reducing thermal shrinkage of the film, a capacitor is conveniently formed, in accordance with the present invention, from a metalized film dielectric spacer with a sleeve of an unmetallized, but otherwise identical, film.

The thickness of the sleeve material is not critical but a sleeve applied as a winding is conveniently formed from a film strip of thickness within the range hereinbefore specified for the dielectric spacer. Preferably, the sleeve film strip is of the same thickness as the dielectric spacer.

When a sleeve is applied in the form of a winding the sleeve strip must usually be of a length such as will encircle the capacitor at least twice to provide the desired compressive force. Preferably, the number of turns or windings in the sleeve is from 10 to 50, depending on the thickness of the sleeve strip material.

Although the sleeve-technique of this invention is particularly applicable to dry capacitors, it may, if desired, be applied to capacitors impregnated with a suitable dielectric impregnant. By an impregnant is meant any of the fluid impregnating agents conventionally employed in the electrical industry. Examples of suitable impregnants are mineral oil, castor oil, cottonseed oil, silicone oil, chlorinated diphenyls, and polybutene. Gases under pressure, for example, dry nitrogen or sulphur hexafluoride may also be used.

Conventional impregnating techniques are, of course, suitable for the impregnation of the capacitors of the present invention, the sleeve preferably being applied prior to the impregnation. Thermal stabilization of the capacitor should, of course, be effected after impregnation has taken place.

For impregnated capacitors, we prefer that the sleeve-material is such as will absorb the optimum amount of the impregnant compared with that absorbed by the dielectric spacer, thereby enabling the sleeve to exert the maximum compressive force on shrinking, and effectively consolidating the impregnated capacitor winding. Thus a polyester sleeve may be employed in conjunction with a polyester dielectric spacer.

The invention is illustrated by reference to the accompanying drawings in which

FIG. 2 is a representation of a fully-wound capacitor encased in a thermally-shrunk sleeve according to the invention.

Figure 1:
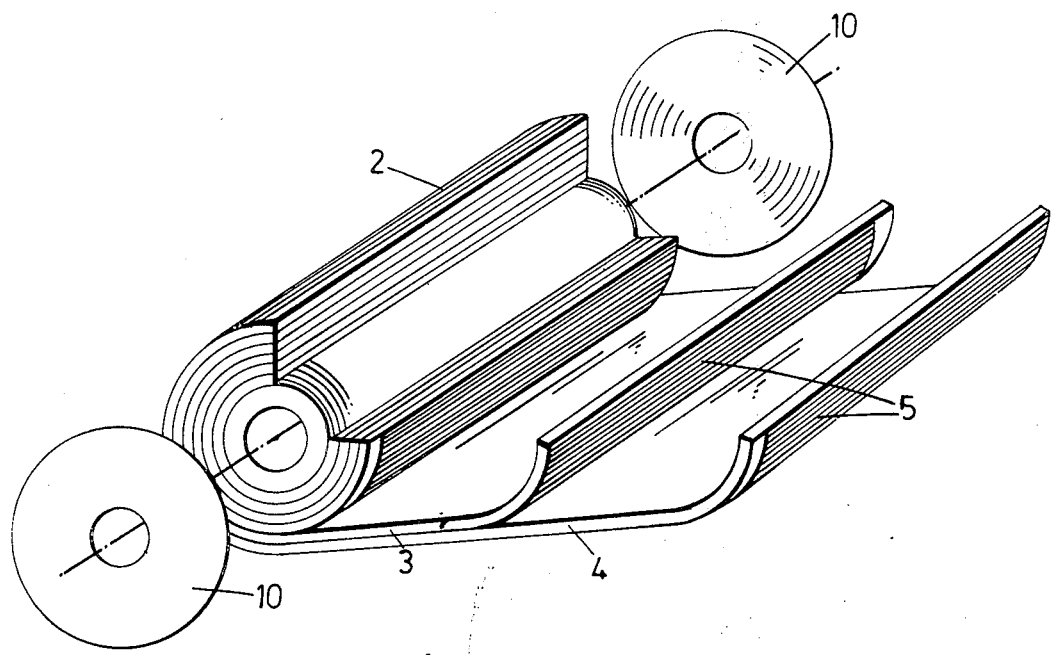
FIG. 1 is a schematic exploded view of a partially-wound capacitor.

Referring to the drawings, a cylindrical, electrical capacitor is formed by winding together onto a tubular polypropylene core member 1 some 200 turns 2 of a pair of metallized, biaxially-oriented polypropylene films 3, 4, each film having deposited on one surface thereof a thin electrically-conductive layer of aluminum 5 so as to leave an unmetallized margin at one edge of each film, the metallized films being wound together so that the unmetallized edges of the respective films are axially spaced apart.

The fully wound capacitor (FIG. 2) is provided with an overwrapped sleeve 6 formed by winding some 35 turns 7 of unmetallized, thermally-shrinkable, biaxially-oriented polypropylene film around the metallized film windings, 3, 4, and securing the free end 8 of the sleeve to the immediately preceding layer of the sleeve winding by a superimposed strip 9 of a polyester electrical grade adhesive tape.

After thermal stabilization in an air oven at a temperature of 115°C. for a period of 4 hours, electrical connection to each end of the capacitor is established by deposition thereon, from a conventional flame spraying device, a sprayed-on end connector 10 of zinc, or of a zinc-tin alloy.

The invention is illustrated by reference to the following Examples.

EXAMPLES 1 TO 6

Each of a series of electrical capacitors, each rated at 240 volts a.c. and having a capacitance of 2.5 microfarads, was prepared by winding together on to a tubular polypropylene core member of 9 mm diameter, some 200 turns of a pair of metalized biaxially oriented polypropylene films, each polypropylene film containing 0.1 percent by weight of 1,3,5-trimethyl-2,4,6-tris(3',-5'-di-t-butyl-4'-hydroxybenzyl) benzene, as an antioxidant, and 0.1 percent by weight of calcium stearate as an anti-corrosion agent, being some 75 mm wide and 8 μm thick, and having deposited thereon a layer of aluminium some 10 nm in thickness. Each of the polypropylene films had a thermal shrinkage in the Longitudinal or Machine Direction, and in a direction, at right angles thereto — the Transverse direction, when maintained unrestrained in an air oven at 115° C for 15 minutes, as specified in the accompanying Table.

Each of a series of similarly prepared capacitors was provided with an overwrapped sleeve in the form of 35 turns of unmetallized, but otherwise identically constituted, biaxially oriented polypropylene film of 8 μm thickness and 75 mm width, the film having a thermal shrinkage, as specified in the accompanying Table. The free end of the overwrapped winding was secured to the immediately preceding layer of the sleeve winding by means of a superimposed polyester, electrical grade, adhesive tape.

The sleeve (Examples 1–3) and unsleeved (Examples 4–6) capacitors were thermally stabilized by exposure in an air oven at a temperature of 115° C for 4 hours. The thermally stabilized capacitors were then provided with sprayed-on end connectors, and subjected to cyclic endurance testing in accordance with British Standard 4017, at 315 volts a.c. and 85° C for 84 cycles. Capacitance loss as a result of this testing is shown for individual capacitors in the accompanying table.

Table

| Example | Thermal Shrinkage | | Sleeve | Shrinkage Ratio | | Capacitance Loss |
|---|---|---|---|---|---|---|
| | Spacer | | Sleeve | LD Spacer: TD Spacer | LD Sleeve: LD Spacer | |
| | Longitudinal (LD) % | Transverse (TD) % | Longitudinal (LD) % | | | % |
| 1 | 2.5 | 1.5 | * not fitted | 1.67 | — | 7.0 |
| 2 | 5.5 | 2.5 | * not fitted | 2.2 | — | 5.0 |
| 3 | 7.5 | 3.0 | * not fitted | 2.5 | — | 4.0 |
| 4 | 5.5 | 2.5 | 6.0 | 2.2 | 1.09 | 1.5 |
| 5 | 5.5 | 2.5 | 8.0 | 2.2 | 1.45 | 1.4 |
| 6 | 7.5 | 3.0 | 8.0 | 2.5 | 1.07 | 0.5 |

* Comparative experiments, not according to present invention.

EXAMPLES 7 to 11

A series of sleeved capacitors, each rated at 440 volts a.c. and having a capacitance of 3.5 microfarads, was prepared by the procedure of Example 4 using some 400 turns of metalized polypropylene film chemically identical to that of Example 4 except that the base film had a thickness of 13 μm. Each capacitor was provided with an overwrapped sleeve comprising 16 turns of unmetallized, biaxially oriented polypropylene film chemically identical to that of Example 4 but of 13 μm thickness.

The capacitors were then subjected to cyclic endurance testing, as described in British Standard 4017, at 550 volts a.c. and 85° C. Capacitance loss in individual capacitors, as a result of this testing, is shown in the accompanyng Table.

Table

| Example | Thermal Shrinkage | | | Shrinkage Ratio | | Capacitance Loss | |
|---|---|---|---|---|---|---|---|
| | Spacer | | Sleeve | LD Spacer: TD Spacer | LD Sleeve: LD Spacer | | |
| | Longitudinal (LD) % | Transverse (TD) % | Longitudinal (LD) % | | | after 15 cycles % | after 42 cycles % |
| 7 | 2.0 | 1.4 | 6.0 | 1.43 | 3.0 | open circuit | — |
| 8 | 2.0 | 1.4 | 8.4 | 1.43 | 4.2 | open circuit | — |
| 9 | 5.5 | 3.1 | 6.0 | 1.77 | 1.09 | 6.4 | 24.2 |
| 10 | 5.5 | 3.1 | 8.4 | 1.77 | 1.53 | 6.3 | 19.7 |
| 11 | 8.0 | 4.1 | 8.4 | 1.95 | 1.05 | 5.7 | 12.2 |

After a few cycles of the test, the capacitors having a low shrinkage dielectric spacer (Examples 7 and 8) had completely failed, giving open circuit units. The test was therefore interrupted after 15 cycles, and terminated after 42 cycles, when the remaining capacitors, made according to the present invention, still exhibited a reasonable capacitance loss, as shown in the Table.

EXAMPLES 12 to 16

The procedure of Example 11 was repeated and a series of capacitors prepared from the aluminium coated, polypropylene dielectric spacer having a longitudinal thermal shrinkage of 8 percent and a transverse thermal shrinkage of 4.1 percent, wound with the unmetallized polypropylene sleeve material having a longitudinal thermal shrinkage of 8.4 percent. The number of turns of sleeve material was progressively increased throughout the series, and the results obtained on testing each capacitor by the procedure of Example 11 are illustrated in the accompanying Table.

Table

| Example | Sleeve | Capacitance Loss | |
|---|---|---|---|
| | No. of turns | After 42 cycles % | After 77 cycles % |
| 12 | 16 | 12.2 | — |
| 13 | 32 | 9.3 | — |
| 14 | 64 | 7.3 | — |
| 15 | 96 | 5.8 | 13.3 |
| 16 | 128 | 4.2 | 8.4 |

The above results demonstrate the reduction in capacitance loss obtained by increasing the number of turns in the overwrapped sleeve.

EXAMPLE 17

Capacitors prepared in accordance with Example 12 but having an overwrapped sleeve comprising 24 turns of the sleeve material instead of the 16 turns of Example 12 were subjected to a continuous long term endurance test in accordance with Standard 252 of the International Electrotechnical Commission. After 500 hours testing at 440 volts 85° C, the average capacitance loss of these capacitors was 1.7 percent.

EXAMPLE 18

Capacitors prepared in accordance with Example 17, but having 96 turns of overwrapped sleeve instead of the 24 turns of Example 17 were subjected to a continuous long term endurance test as defined in Example 4. After 500 hours testing at 475 volts and 85° C, the average capacitance loss was 1.6 percent.

I claim:

1. A wound, thermally stabilized electrical capacitor comprising at least a pair of electrically conductive electrodes, an insulating dielectric spacer disposed therebetween, the electrodes and spacer being wound together to form the capacitor winding, and a constrictive sleeve enveloping the winding, wherein
    a. the spacer comprises a longitudinal thermoplastic polymeric film strip having (1) a thermal shrinkage in the longitudinal direction of from 5.0 to 10 percent, and (2) a ratio of thermal shrinkage in the longitudinal direction to that in a direction at right angles thereto of from 1.7:1 to 10:1, and
    b. the sleeve (1) extends over at least 75 percent of the exposed surface area of the capacitor winding, and (2) is of a material having a thermal shrinkage in the longitudinal direction at least 1.02 times that of the spacer, said thermal shrinkages being determined at the thermal stabilizing temperature.

2. A capacitor according to claim 1 wherein the longitudinal thermal shrinkage of the dielectric spacer is from 5.5 to 8.5 percent.

3. A capacitor according to claim 1 wherein the spacer has a ratio of longitudinal to transverse thermal shrinkage of from 1.75:1 to 2.5:1.

4. A capacitor according to claim 1 including an integrated spacer-electrode in the form of a metallized polymeric film.

5. A capacitor according to claim 1 wherein the spacer is a film of a crystalline propylene homopolymer, or a copolymer thereof with up to 15 percent by weight, based on the weight of the copolymer, of an unsaturated comonomer.

6. A capacitor according to claim 1 wherein the sleeve material has a longitudinal thermal shrinkage of from 1.05 to 2.5 times that of the spacer.

7. A capacitor according to claim 1 wherein the sleeve and the dielectric spacer are of the same polymeric material.

8. A method of forming a wound electric capacitor comprising winding together at least a pair of electrically conductive electrodes with a dielectric spacer disposed therebetween, the electrodes and spacer together constituting the capacitor winding, enveloping the winding in a thermally shrinkable sleeve, and thermally stabilizing the sleeved winding, wherein
    a. the spacer comprises a longitudinal thermoplastic polymeric film strip having (1) a thermal shrinkage in the longitudinal direction of from 5.0 to 10 percent, and (2) a ratio of thermal shrinkage in the longitudinal direction to that in a direction at right angles thereto of from 1.7:1 to 10:1, and b. the sleeve (1) extends over at least 75 percent of the exposed surface area of the winding, and (2) has a thermal shrinkage in the longitudinal direction at least 1.02 times that of the spacer, said thermal shrinkages being determined at the thermal stabilizing temperature.

9. A method according to claim 8 wherein the spacer is a film of a crystalline propylene homopolymer, or a copolymer thereof with up to 15 percent by weight, based on the weight of the copolymer, of an unsaturated comonomer.

10. A method according to claim 9 comprising thermally stabilizing the capacitor at a temperature of from 105° to 125° C.

* * * * *